(12) United States Patent
Nuss

(10) Patent No.: US 9,361,070 B1
(45) Date of Patent: Jun. 7, 2016

(54) COMPILING REGULAR EXPRESSION SIDE-EFFECTS TO JAVA OR C# CODE

(76) Inventor: Andrew Nuss, Reno, NV (US)

(*) Notice: Subject to any disclaimer, the term of this patent is extended or adjusted under 35 U.S.C. 154(b) by 779 days.

(21) Appl. No.: 13/359,763

(22) Filed: Jan. 27, 2012

(51) Int. Cl.
G06F 9/44 (2006.01)
G06F 9/45 (2006.01)

(52) U.S. Cl.
CPC .. *G06F 8/31* (2013.01); *G06F 8/41* (2013.01); *G06F 8/42* (2013.01)

(58) Field of Classification Search
None
See application file for complete search history.

(56) References Cited

U.S. PATENT DOCUMENTS

| 7,774,376 | B1* | 8/2010 | Meijer | G06F 8/315 707/802 |
| 2002/0029231 | A1* | 3/2002 | Aptus | G06F 8/20 715/210 |
| 2002/0108101 | A1* | 8/2002 | Charisius | G06F 8/20 717/105 |
| 2007/0022414 | A1* | 1/2007 | Bird | G06F 9/45508 717/143 |
| 2008/0163165 | A1* | 7/2008 | Shitrit | G06F 11/3688 717/107 |
| 2011/0295854 | A1* | 12/2011 | Chiticariu | G06F 17/30616 707/737 |

OTHER PUBLICATIONS

Salcianu et al. "Purity and Side Effect Analysis for Java Programs." VMCAI. vol. 5. 2005. Retrieved on [Feb. 1, 2016] Retrieved from the Internet: URL<http://people.csail.mit.edu/rinard/paper/vmcai05.purity.pdf>.*

Tkachuk et al. Adapting side effects analysis for modular program model checking. vol. 28. No. 5. ACM, 2003. Retrieved on [Feb. 17, 2016] Retrieved from the Internet: URL<http://dl.acm.org/citation.cfm?id=940097>.*

* cited by examiner

Primary Examiner — Thuy Dao
Assistant Examiner — Cheneca Smith
(74) Attorney, Agent, or Firm — Charles L. Thoeming

(57) ABSTRACT

An entire regex scripting grammar, including DoPattern side-effects and parameterizable rules with parameters accessible by DoPatterns and CapturePatterns declared within, is compiled to 100% Java™ or C# code (rather than bytecode instructions of a specialized, embedded virtual machine), given a suitable change to the translator and additional helper classes in the library for primitive int and String data-type mappings. The regex scripting grammar realizes the advantages of hotspot compilation for the entire script, including side-effects. Side-effect pseudo-instructions generated by the automata are a stream of integers referenced to various DoPattern objects created by the script at regex composition time, rather than being a stream of instructions modeling the prelist and postlist statements of the DoPatterns written in the grammar.

14 Claims, 3 Drawing Sheets

*12*

70 — modeling a DoPatternImpl as a pure abstract class with an abstract "body" function, and abstract "prelist" function and an abstract "postlist" function

COMPILING REGULAR EXPRESSION SIDE-EFFECTS TO JAVA OR C# CODE

CROSS-REFERENCES TO RELATED PATENTS

The following are related patents: 1) U.S. Pat. No. 7,093,231, titled Grammar for Regular Expressions (referred to in this document as "the '231 patent"), which explains how side-effects much more powerful than the N-th parenthetical string capture can be compiled into a regex and executed as side-effect instructions of its automata; and 2) U.S. Pat. No. 7,496,892, titled Polymorphic Regular Expressions (referred to in this document as "the '892 patent"), which explains the value and novelty of offering the regex rules (or Pattern functions) of the '231 patent as polymorphic member rules of a struct, such that the regexes of a virtual rule have access to the struct data members in which the rule is declared, and such that these rules can have derived, or polymorphic, behavior for both matching and side-effect behaviors.

The reference implementation for the grammar disclosed in these two related patents is further detailed and offered at the website www.ptilde.com.

STATEMENT REGARDING FEDERALLY SPONSORED RESEARCH OR DEVELOPMENT

None.

REFERENCE TO A MICRO-FICHE APPENDIX

None.

NOTICE REGARDING COPYRIGHTED MATERIAL

A portion of the disclosure of this patent document contains material which is subject to copyright protection and/or copyright registration. The copyright owner has no objection to the facsimile reproduction by anyone of the patent document or the patent disclosure as it appears in the file or records maintained by the United States Patent and Trademark Office, but the copyright owner otherwise reserves all copyright rights whatsoever.

TECHNICAL FIELD

The technical fields relating to this invention are (1) garbage-collected, hotspot-compiled languages, such as C# and Java™, which offer nested and inner classes respectively, and (2) regular expression engines and libraries, such as offered by Java™ and C# and Perl, although compiling regular expression side-effects to Java™ or C# code's regular expression engine (and that of the '231 patent upon which it is based) is implemented with a finite automata that does no backtracking versus almost all of the existing art which are engines based on the Perl innovations which use backtracking in general to evaluate expressions. In fact, the book "Mastering Regular Expressions" by Jeffrey Friedl explains that "side-effects" cannot be offered by non-backtracking (DFA) engines, but the '231 patent proves that this is not the case, and, in fact, true "side-effects" that involve the compilation of statement-lists that wrap regexes is available not with the existing art, but only with the automata engine of the '231 patent.

BACKGROUND OF THE INVENTION

History of Regular Expression Side-Effect Development

The current state of regular expression side-effects in the marketplace is that the following are available: (1) Perl-like regex grammars, which offer the capturing of the N-th parenthetical expression and offer the return of a string by performing a global replacement of one regex with a specific string literal; (2) Perl itself has in addition to this the ability to embed side-effect statements in the regex, but these are terribly flawed in that they execute as the backtracking engine encounters them in its forward and backwards movements through the stream, rather than executing them as true side-effects if and only if they are involved as a matching sub-expression of the final best match determined. Compiling regular expression side-effects to Java™ or C# code builds upon two previous patent documents (written by the applicant) on regular expression side-effects, which patent documents show how a finite automata can offer side-effects that are truly accurate and very powerful grammatically to the programmer, correcting the flaws of Perl side-effects. The '231 patent shows that functional statements of the host grammar can be embedded in DoPatterns, such that the pattern matching characteristics of a sub-expression are specified with the Pattern composition grammar, and then the functional statements that are to execute if and only if this subpattern is found to be part of the best total match, are wrapped in a "pre-list" and a "post-list" as comma separated statements. The '231 patent also teaches that the DoPattern could contain variables scoped to the DoPattern, and that the statements in the "pre-list" and "post-list" could not only use the variables defined and initialized in the DoPattern "pre-list", but that the functional statements in these statement lists that wrap that matching characteristics could access variables in outer scopes, such as the parameters of the rule in which this DoPattern is declared. The '892 patent extended the first to allow the DoPattern, and closely related CapturePattern to access at side-effect time (in the pre-list and post-list) the member variables of the struct in which the DoPattern is declared. Thus member functions (previously called "rules") of the struct would just define and return regular expressions (of data-type Pattern), and one best practice identified would be to declare such rules in the base class to only specify the regular expression matching characteristics, and then declare a sub-class which redefines that rule to include side-effects, and duplicating the matching characteristics of that rule as defined by the base class.

In both cases, a virtual machine was described which was capable of executing the regex match, and additionally accumulating the side-effect instruction opcode stream corresponding to the DoPattern pre-list and post-list statements (of all DoPattern sub-expressions involved in the best match to the data), to be executed as a result of the match. The resultant expressivity of such a grammar was disclosed, with examples of how it offers a new and easier approach to solving the matching problems. In short, a document level expression, or at least an expression that matches a large recognition unit of the document, could be composed, sub-expression by sub-expression, and the side-effects that actually solve the problem at hand embedded into the regular expression. This approach contrasts with what regex programmers typically have to do, which is match the stream against one fine-grained regex at a time, query for substring matches, and then do something with those matches, which means switching in and out of matching mode and functional programming modes. Better in the inventions is to embed the side-effects of the regex match into the regex itself, so that if the goal is to accomplish in side-effects the capture an array of matches, do it by binding the capture into the array into a regex, and then adding a repeat operator to repeat the regex match one or more times. This technique contrasts with the art which for repeated complex capturing requires that you execute the target match against the stream one at a time, and then stuff the parenthetical matches in functional code interleaved with reapplying the regex to the stream.

Novelty of the New Invention

Compiling regular expression side-effects to Java™ or C# code discloses and demonstrates that with certain modifications to the regex engine of the '231 patent itself, this grammar does not need its own virtual machine. Rather, the scripts written in the grammar of the invention can be compiled directly to Java™ classes, or alternatively, C# classes. This means that the side-effect statements are also compiled to Java™ code, and get the benefit of hotspot compilation, resulting in a program whose regular expression side-effects run at speeds comparable to that of regular Java™ functional programming.

Translating a grammar into Java™ code is not a novel thing to do, but the advantages of being able to do this are well-known. This is why, for example, the Groovy and Scala languages are gaining so many adopters. What is new to compiling regular expression side-effects to Java™ or C# code is that the side-effects of a regular expression, going far beyond capturing the N-th parenthetical matches, can be offered without embedding another virtual machine into a library hosted by Java™ or C#; that is, DoPattern and CapturePattern side-effects can be compiled into Java™ code or C# code.

DISCLOSURE OF INVENTION

How DoPattern Side-Effects Compile to Java™

All functions that return a regular expression, that is, the Pattern data-type, are declared as inner classes of the scope in which they are declared. That is, if the function is a member of a struct, then it is declared and modeled as an inner class of the class corresponding to the struct. If the function is in global script scope, it is declared and modeled as an inner class of the class which is defined for that script. This means that arguments of a function (returning a pattern) and its local variables are declared as private members of said inner class, the body of the function is declared inside a "$invoke" member of the inner class, and the call of this function involves constructing the inner class, initializing its private members corresponding to the arguments with the actual values of the arguments passed in the program, and then passing control to the "$invoke" function, which returns the result of the function being modeled.

This transformation of a function into an inner class (with argument and local variables as data members) will be presented in detail, with example sources, in the "best practice" section. The requirement for this innovative transformation in "compiling regular expression side-effects to Java™ or C# code" is that side-effect statements of the regex "fire" not when the function, that returns a regex, is called, but long after the function has been called. This means that the function's arguments and local variables must persist beyond the calling frame of the function (for use in the "prelist" and "postlist" DoPattern statements), which is why they are put into a class as data members.

A second step of compiling regular expression side-effects to Java™ or C# code is that the DoPattern class of the invention needs to be an abstract class with three abstract functions—named prelist and postlist and body. Whenever a specific DoPattern is to be compiled from the regex script grammar to Java™ or C# code, it must be declared as an inner class (extending DoPatternImpl) in the scope in which it is declared in the script, and the prelist and postlist and body functions then receive automatic access, through Java™ inner classes (or C# nested classes with some semantic sugar for the outer class "this" member) to all of the variables and functions at outer scopes relative to the DoPattern's declaration point. The variables declared in the scope of the DoPattern (in its prelist or postlist) are simply declared as members of the DoPattern's inner class and the concrete version of the inner class must compile the list of "prelist" statements in the DoPattern grammar to be the Java™ code of the prelist member function, and similarly for the postlist member function.

A final step of the invention fundamentally differentiates this invention from that of the '231 patent, which first disclosed how a regular expression could have true side-effects. This step is that the statements of the DoPattern's prelist and postlist need to execute as Java™ and C# bytecodes, and since they cannot be embedded as bytecode snippets into the automata, and then accumulated as a stream of bytecodes for execution, pseudo instructions are now introduced as references to the specific DoPattern object that host the prelist and postlist functions. These pseudo instructions are embedded into the finite automata corresponding to the regex, rather than instructions of a specialized and slow additional VM. This is a simple replacement step, and requires no other change to the automata code relative to the '231 patent, because the vm "bytecodes" of the '231 patent were ints. Also, the concept that we will term "drawers" is introduced, in which all of the DoPattern inner class objects that are involved in the final regular expression composition to be executed are put into an growable array, and when the automata is created for an outermost regex to be executed against a stream, it is then "drawer-bound". That is, all of the DoPattern sub-regexes of the outer expression are recursively walked, and each specific DoPattern object, corresponding to an inner class discussed above is put into the drawer, and the index of the drawer is stored with the prelist pseudo instruction opcode and the index of the drawer is again stored with the postlist pseudo instruction opcode, and these minimal instruction opcodes are tied to the DoPattern object corresponding to the DoPattern declaration and invocation, and these pseudo instructions are also tied to the nodes and arcs of the resulting automata, as described in the '231 patent for the DoPattern's instruction opcodes.

The last step, in keeping with this design, does not affect the creation of the automata's nodes and arcs, but rather the execution of the graph. During execution of the stream against the automata, when accumulating the prelist and postlist pseudo ops (and corresponding drawer indices) for the best match to the regex against the stream, the current stream absolute position is inserted as an opcode itself just before the prelist opcode/drawer index tuple, and the same for the postlist. This is because the prelist and postlist may need access to the stream position at the moment of the match, and this is especially the case of the DoPattern that compiles the substring CapturePattern, because it needs the endpoints of the match at the time of the match, known only by the automata.

BRIEF DESCRIPTION OF DRAWINGS

FIG. 3 is a flow chart illustrating an additional example method step that may be performed by a computing device to compile regular expression side-effects to Java™ or C# code of FIG. 2.

BEST MODE FOR CARRYING OUT THE INVENTION

Figure 1:
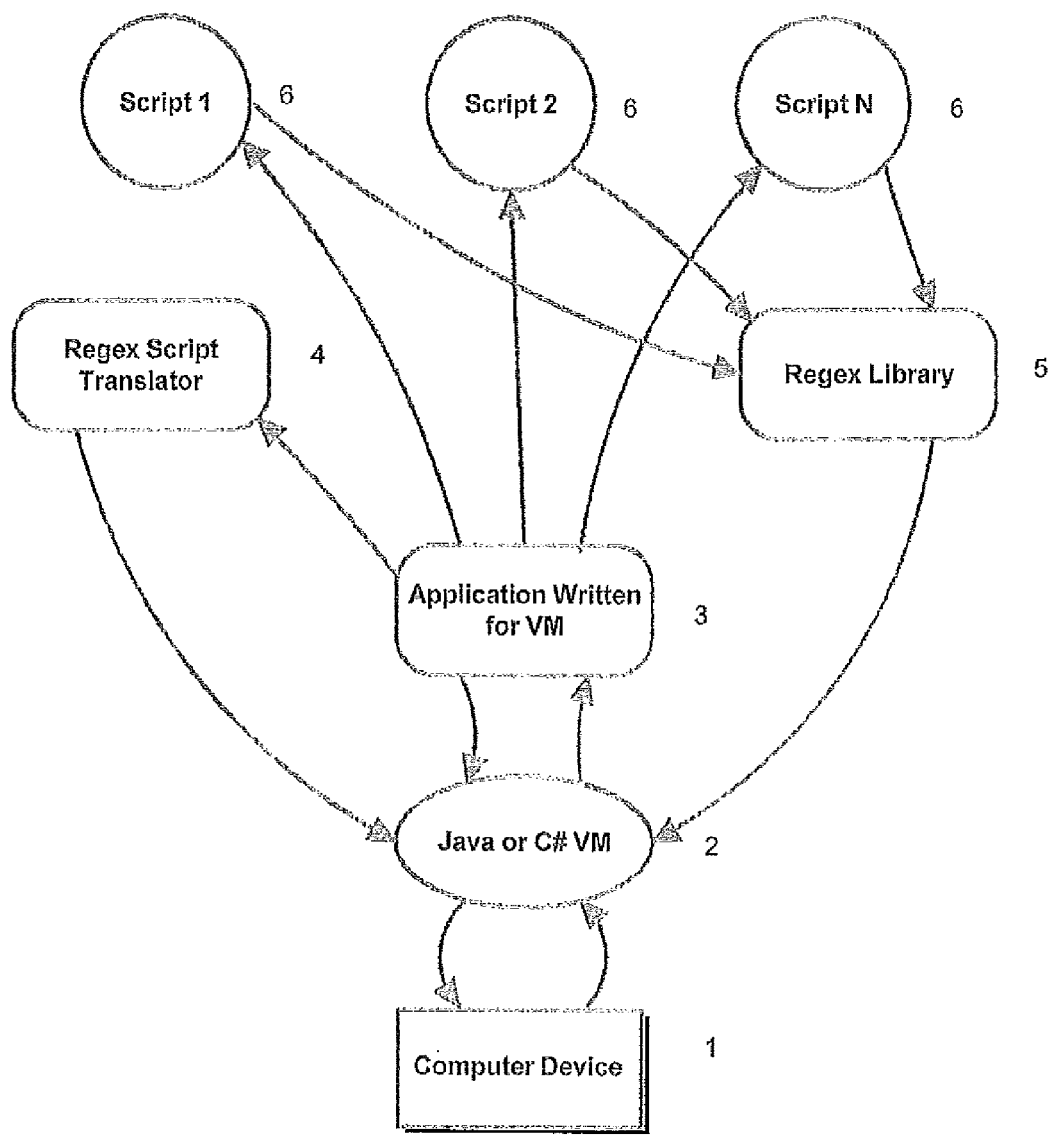
FIG. 1 shows a system data flow diagram describing the flows among the identified methods for an embodiment of compiling regular expression side-effects to Java™ or C# code.

Offering a Script Grammar for Creating Regexes

The best vehicle for the invention is a scripting language, rather than just offering a Java™ library for the regex engine. Although the side-effects need to be fast, which is the very motivation for the subject matter of this disclosure (compiling the regex grammars of the '231 patent and the '892 patent, directly to Java™ or C# code), quite a bit of execution time is spent inside the DFA engine (deterministic finite automata) of the invention, whereby a regex is matched against a stream. Thus, at a minimal cost to execution speed of the regex, a specialized grammar is presented (in the referenced patents and somewhat herein), so that the programmer doesn't have to hand code his inner classes in the same inner fashion in which the disclosed script translator produces Java™ or C# code. It is easier for the programmer to produce correct results with a scripting grammar than to hand translate his regular expression and side-effect intent after the inner class design pattern disclosed throughout this document. There is just so much semantic sugar that can be offered in the regex scripting grammar, in terms of expressivity and enforcing correct practices, that the minimal performance penalty relative to the more significant overall cost of the regex matching engine, makes it worthwhile for the programmer to code in a regex scripting grammar that correctly compiles to Java™ classes (or C# classes) rather than coding directly in Java™ according to the public apis of the Java™ library for this method and system of compiling regular expression side-effects to Java™ or C# code.

Compiling to Java™ or C# Classes

The '231 patent and '892 patent pertaining to regular expression side-effects required a specialized VM that ran within the Java™ VM. The reason for this was that dynamic Java™ bytecodes cannot accumulate and execute very easily or very efficiently. Now, when compiling regular expression side-effects to Java™ or C# code the statements of the prelist and postlist of the DoPattern are derived functions of an abstract DoPatternImpl class, and in this way, by inserting one pseudo instruction into the automata and side-effect stream of instructions for the prelist, and one for the postlist, the statements of the DoPattern prelist and postlist side-effects are compiled and executed as Java™ statements and Java™ bytecodes, and get the benefit of hotspot compilation. Also, and as a result of this step, the automata execution engine aggregates only 2 pseudo-ops as entry points to the Java™ function, rather than a longer stream of instructions in a specialized and slow VM.

Thus, a central improvement by compiling regular expression side-effects to Java™ or C# code is, namely, that by compiling the scripts of the regex grammar to Java™ or C# classes directly, hotspot compiler speeds are provided for the regex side-effects.

Inout or Reference Variables

Semantic sugar of the regex scripting grammar needs in-out, or reference parameters of functions. An example of how a regex rule/function can be parameterized with a reference (in-out) parameter which holds the results of the side-effects of the function's regex is provided in a subsequent section. This means that primitive data-types, which map to Java™ counterparts, must be held in small class objects that are mutable, analogous to a Java™.lang.Integer if it were mutable (it is not) (Java™.lang.Integer objectifies an integer). In C++, a reference parameter is much like a pointer, and often compiles as such, but in Java™ the analog to an in-out/reference variable must be held in a tiny class object. Thus, without significantly impacting the performance of the regex engine, where much of the time is spent in matching and accumulating side-effects, all of the scripting grammar's primitive variables are maintained in tiny "var" objects. This allows the translator to implement reference variables, a feature not offered by Java™ out of the box. It turns out this also aids in the accessibility of the references value of a string at side-effect time for a CapturePattern.

As a result, references to Strings, whose values can be changed by the side-effects of a Pattern-returning function (or rule of the '231 patent), are passed to the capture pattern.

Possible Optimizations for the Translator

A primary optimization envisioned for compiling regular expression side-effects to Java™ or C# code is one pertaining to the notion that for Pattern rules which embed side-effects that access local variables or rule arguments, such rules are compiled as inner classes at the point of declaration, said inner class having an "invoke" member which models the body of the function, said inner class modeling the arguments of the rule as data members. This allows the side-effects of a DoPattern regex composed in that function to execute after the function returns, that is, the Pattern returned by the function is executed along with its side-effects long after the function composes said Pattern, but the side-effects may reference and/or change the values of the parameters passed to the function at the time of composition. In other words, for every rule, or Pattern function, there is "composition time" and "automata side-effect execution time". The latter happens after the rule function has already returned, but because the parameters, and even local variables may be accessed by this function at the latter "time", these parameters and local variables must persist. This means that parameters thusly accessed need to be data members of the class. And, as previously disclosed, the accessed parameters need to be an inner class in order that the DoPattern's side-effect inducing statements in the prelist and postlist have access to variables in scopes external to the rule, Pattern function, such as struct scope and global scope.

Functions which do not compose regular expressions containing DoPatterns do not need to be translated as inner classes in this fashion. They will be somewhat faster if translated to Java™ code as true functions with stack-based parameters and local variables. This is an optimization for the translator, and is mentioned here as best practice for compiling regular expression side-effects to Java™ or C# code.

The Detailed Steps of the Invention

In the following sections, the steps outlined above will be discussed in more detail, and in the disclosure, each step will build upon the previous step.

Offering a Regular Expression Grammar Rather Than Just a Library

The motivation for compiling regular expression side-effects to Java™ or C# code, after implementing the reference version for the first two inventions, was to investigate whether it would be simpler for programmers to code to and use a Java™ library, rather than writing code in a specialized regex scripting grammar that looks and feels like Java™ but introduces the Pattern data-type.

The investigation centered on the principle innovation of the '231 patent, namely the DoPattern. How would a programmer code using the DoPattern class, rather than using a specialized scripting grammar for a DoPattern? First, the programmer would have to declare a concrete instance of an abstract DoPattern that had abstract prelist and postlist and body member functions. No problem in this. But the prelist and postlist statements do not generally standalone, that is, they do not just call System.out.println. The prelist and postlist statements usually reference variables in scopes external to their declaration point in order to do something useful. The natural Java™ analog to this is an inner classes, so it was seen that a programmer coding to a Java™ regex library offering the '231 patent and '892 patent would have to write all of his DoPatterns as inner classes of the scope to which they belonged.

Then it was seen that such concrete DoPattern inner classes would have to have access to the parameters and local variables of the "rules" of the first and '892 patent. This in turn meant that such rule functions would have to be modeled as inner classes themselves, and then the DoPatterns of such a rule, very common in useful solving techniques of the invention, would be inner classes of the inner class modeling the "rule" function. This was seen as too difficult a design pattern to expect of an adopter of a library, but that a translator for the scripting grammar outlined in the first two inventions could indeed produce just such inner class nesting for concrete DoPatterns and their prelist and postlist member functions. In fact, with suitable modifications, the translator for the first two inventions becomes the translator of compiling regular expression side-effects to Java™ or C# code, producing the inner class Java™ or C# nesting code just described, rather than stringified instructions of a new virtual machine.

Accordingly, the pure Java™ library idea is in the right direction, because then it is possible to execute regular expression DoPattern side-effects at hotspot speed, but the reference grammar of the '231 patent, offered at www.ptilde.com, persists as the most desirable way to solve the pattern matching problem. Hence, compiling regular expression side-effects to Java™ or C# code becomes a vehicle for offering the side-effect innovations of the first two inventions at hotspot compilation speed.

Making Grammar Type-Compatible with Host Language (Java™ or C#)

It has been seen that side-effects of the regular expression scripting language have to do something useful on behalf of the Java™ or C# application that invokes the script. Sometimes this involves producing an output stream, but usually this involves producing an output data structure, or even invoking function callbacks in objects belonging to the application class that calls the script. This in turn implies that all of the data-types of the scripting language other than Pattern have exact analogs in the host language, Java™ or C#. So an "int" in the scripting grammar corresponds to an "int" primitive of Java™, and similarly with String and other data-types. Moreover, it must be possible to import custom data-types created by the application programmer, so the scripting grammar must have an "import" grammar analogous to a Java™ import. With this requirement in place, and the ability of the script translator to wrap a Java™ "int" as a script grammar "int", a Java™ "String" as a script grammar "String", and so on, as well as wrapping in the opposite direction, we meet the requirement that the regex scripting programmer be able to do something useful on behalf of the Java™ programmer beyond returning a boolean match flag or an output Stream. It is also noteworthy that the script grammar be able to call native (Java™ or C#) application functions.

Offering In-Out or Reference Parameters to all Functions

It was seen in the '231 patent that in-out variables were needed for parameters of rule functions, to aid in allowing regex "rules" to do useful things in a parameterizable and thus reusable way. The optimal grammar for this is seen in the existing reference version for the first two inventions, and postfixes the & operator to the data-type, as in C++. In the reference version of the first two inventions, unique instruction opcodes achieve this in-out param, but compiling regular expression side-effects to Java™ or C# code requires Java™ or C# code for everything. Thus, in compiling regular expression side-effects to Java™ or C# code's library, specifically in the package p7e.lang, tiny class object wrappers are provided for each of the data-types, analogous to how Java™.lang.Integer objectifies the primitive int and allows reflection of an int parameter as well as other uses. But in the analog to Java™.lang.Integer, setters, as well as getters, are provided, and so the analog is mutable. This meets the stated requirement of the '231 patent, that the Pattern rules offer in-out parameters.

"var" Data-Type of the Library

Though value parameters and local variables, that is, non-reference parameters, would most efficiently translate exactly as Java™ primitives, it was seen as preferable in minimizing the work of the translator that all variables in every scope, and whether in-out or not, be declared as tiny class objects, as if holding an in-out reference parameter. In effect, the requirement of a reference parameter, to which any local variable's reference can be passed, suggests for minimizing the work of the translator that all variables be modeled as tiny class objects that hold a primitive. Moreover, with use of generics a single getter/setter api generic class whose T is the Java™ type that corresponds to the scripting type is defined, and this defined generic class implements all variables in the scripting language at every scope. For each of the major types one concrete instantiation of that class is presented. This class is called "var" and lives in the p7e.lang package. It is given as follows:

```
package p7e.lang;
/**
 * All variable classes are used as variable holders in every scope, as well as
 * reference parameters.
 * The generic param T is the object "held/referenced" by this P~var.
 * <p>
 * NOTE: the language no longer prevents null pointer exceptions with String
 * and arrays, etc.
 */
public abstract class var<T> implements Comparable<var<T>>{
    /**
     * Return one of the types in type. Java™ for this concrete class.
     * <p>
     * NOTE: when the type is an array, the low 16 bits are the type.ARRAY
     * and the high 16 bits are the dimension
     */
    public abstract int type ( );
    /**
     * All variables in the language allow a null value.
     */
    public abstract boolean isnull ( );
    /**
     * All variables in the language can be set with this function.
```

```
*/
public abstract var<T> set (T val);
/**
 * This version of getter is used only for getting the value to
      stuff into
 * a same type variable.
 */
public abstract T get ( );
/**
 * This version of getter is used only for converting a scalar
      value to do
 * false or 0 or '\u0000', otherwise it returns T
 */
public abstract T getsafe ( );
}
```

This class is then subclassed to have varint, varlong, varstring, etc for all the major types, such that varint uses Java™.lang.Integer for T, varlong uses Java.lang.Long for T and varstring uses p7e.lang.string for T.

Making Pattern a Built-in Data-Type of the Regex Scripting Grammar

As disclosed in the '231 patent, it was seen that Pattern is a built-in datatype of the scripting language, and facilitates the incremental composition of bigger regexes from more fine-grained regexes, ultimately resulting in large-scale document level regexes of the '892 patent. Each of the Pattern compositions has its own specific class object, such as the RepeatPattern, the ConcatPattern, and the UnionPattern, as seen in the code of the reference version of the first two inventions. This continues to be the case in compiling regular expression side-effects to Java™ or C# code. However, the DoPattern is now modeled as an abstract class, and the translator translates the DoPattern grammar of the script to a concrete instantiation of this abstract class, providing specific implementations for the prelist and postlist abstract functions of DoPattern which correspond to the prelist and postlist statements of the grammar of the '231 patent.

Similarly, the modeling of the CapturePattern is changed. The class corresponding to CapturePattern is still not abstract, but now it is constructed with a reference to the specific var<string> object into which String capture is performed. It is accomplished with a specific concrete subclass of DoPatternImpl, as opposed to having its concrete subclass generated by the translator as with the DoPattern grammar.

The Two Timelines of a DoPattern and CapturePattern

The need for garbage collection is a required feature of the host language of compiling regular expression side-effects to Java™ or C# code's grammar. This is particularly true for side-effects that reference local variables and "rule" parameters. Side-effects of a DoPattern happen in the second timeline of the DoPattern, that it, is when it is executed (matched against the stream), which happens long after its point of creation. In order for the side-effects to have access to the "rule's" parameters and local variables, we have seen that an inner-class modeling of both the rule function and the DoPatterns in it is required in order to compile to Java™ or C# code rather than instructions of a specialized VM. Implied in this requirement is that the reference to the inner classes must persist as long as there is a reference to the concrete DoPattern, so that when it is finally matched, there is a chain of references to the rule parameters used by the DoPattern's prelist and postlist functions. This requirement further effectively ties the grammar to virtual machine systems. It does not eliminate the possibility of compiling the script into C++ code, only that to do this at the time of this disclosure, it would require writing in C++ a garbage collector, meaning essentially a reinvention of Java™ or C#. And, failing that, for a port to C++ using simple reference counting for all of the var<T> variables of the script as C++ template class instances, a script written by the programmer could create circular references that would not be destroyed until script completion, though this is probably acceptable. It is seen, therefore, that though the invention can eventually be offered in C++ for C++ programmers (such as when C++ has garbage collection), it is much more convenient to offer it in C# and Java™, leveraging existing VM architectures, hardware, and garbage collectors.

Compiling DoPattern to an Inner Java™ Class

This major step of compiling regular expression side-effects to Java™ or C# code is disclosed, whereby the DoPattern grammar is now the combination of an abstract DoPattern class in the library, and the translator generating Java™ or C# code which subclasses from DoPatternImpl, and generating the concrete subclass as an inner class at the scoping point of the DoPattern. All variables in the program (except block statement scoped variables which we will later see) are declared in their own inner class as members, to give the DoPattern side-effect statements access to variables in all outer scopes. Consider now a "rule" function which contains a DoPattern and a CapturePattern. This relationship will serve as the primary example of this disclosure, as so many other examples of the scripting grammar in use have been given in the '231 patent and the '892 patent.

```
struct MyStruct {
    String[] ar=new String[] ;
    function Pattern Capture (Pattern p, int index, int& count)
    {
    return do (String s=null; &s(p); ar[index]=s, count++);
    }
}
```

In this scriptlet of the grammar, a struct called "MyStruct" is defined, and which has one data-member, an array of Strings, and one rule called "Capture", which can be instantiated to wrap an existing regex/Pattern such that capture of that match is stuffed into the array and a "count" reference argument is incremented. Note that the "index" value parameter is not used when the function Capture is called, but long after it has returned, because the "index" variable is used in the postlist of a DoPattern used to compose the function's result. This snippet is compiled to Java™ (or C#) code as follows:

```
public class MyScript {
    public class MyStruct {
        private MyStruct     $$ = this;
        public vararray<string>     ar = new vararray<string>
    (type.STRING, string.class);
        public class $constructor {
            // local variables of the constructor go here
            public void $assign ( ) throws Exception
            {
                ar.setLength(0);
            }
            // auto-create this default constructor if no default is given
            public MyStruct $construct ( ) throws Exception
            {
                $assign( );
                return $$;
            }
        }
    public class $func$Capture {
        private varpat       p = new varpat( );
        private varint       index = new varint( );
        private varint       count;
        // transfer arguments to members
        public $func$Capture (Pat p, Integer index, varint count)
        {
```

-continued

```
    this.p.set(p);
    this.index.set(index);
    this.count = count;
  }
  public class $dopat$| extends DoPatternImpl {
    private varstring    s = new varstring( );
    protected Pat body ( ) throws Exception
    {
       varpat $result = new varpat( );
       $result.set(CapturePattern.cons(s, pget( )) );
       return $result.get( );
    }
    protected void prelist (varlong $repos, varstream $rein)
throws Exception
    {
       s.set(null);
    }
    // closure on index is happening here
    // by making $dopat$ 1 an inner class this function
    // has access to
    // the 3 arguments of the effective function and
    // the "ar" member at side-effect time!
    protected void postlist (varlong $repos, varstream $rein)
throws Exception
    {
       ar.get( ).makerefat(index.getint( )).set(s.get( ));
         Helper.pluspluspost(count);
       }
    }
    // function Capture is called thusly:
    //
    //     new $func$Capture(p, index, count).$invoke( )
    //
    public Pat $invoke ( ) throws Exception
    {
       varpat $result = new varpat( );
       $result.set(DoPattern.cons(new $dopat$ 1 ( )));
       return $result.get( );
    }
  }
}
```

Note the inner class $func$Capture. This class implements the "Capture" function/rule of the script, by making it a member inner class of the MyStruct class. This demonstrates the inner class requirement for "rules" that contain DoPatterns previously disclosed. The DoPattern then is accomplished with another inner class, in fact, nested inside of $func$Capture. This inner class is given an anonymous name, $dopat$1, to indicate that it is the first (and only) DoPattern in the struct. The translator always translates rule functions, or for that matter, any function containing one or more DoPatterns this way. The translator creates an inner class to model the "rule" and it nests a set of inner classes inside that one for each of the DoPatterns composed in the "rule". In the above translated code, the prelist and postlist members of the $dopat$1 subclass of DoPatternImpl have access to the 3 parameters of the Capture rule, because it is declared as an inner class. The "body" member of the $dopat$1 class also needs a concrete implementation because it is always generated by the translator (along with the prelist and postlist) to correspond to the pattern expression composition of the DoPattern, the middle of its 3 parts. The "body" member too may need access to the rule parameters (in this case the parameter "p"), and it too therefore needs to be a member function of an inner class.

Finally, note the call to DoPattern.cons( ), which passes a newly constructed $dopat$1 to the DoPattern.cons( ) function. DoPattern.cons( ) creates a DoPattern wrapper for the DoPatternImpl. That is, $dopat$1 provides the 3 specific parts of the DoPattern for this piece of script code, and the DoPattern.cons( ) function creates an object out of it that is capable of producing the sub-component of the automata (nodes and arcs) corresponding to this subexpression. Also, note the comment that to invoke this function we call "new $func$Capture(p, index, count).$invoke( )". Because the inner class $dopat$1 has access to all the members of the parent class object in which it is defined—$func$Capture—this is all that is necessary to invoke the function.

The translator only creates such inner classes for functions (usually rules) which compose DoPatterns. Any other functions are declared with stack-based parameters as normal member functions of the class that models the struct containing the function.

The abstract class DoPatternImpl can be shown as:

```
public abstract class DoPatternImpl extends Pat {
    protected abstract Pat body ( ) throws Exception;
    protected abstract void prelist (varlong $repos, varstream
$rein) throws Exception;
    protected abstract void postlist (varlong $repos, varstream
$rein) throws
Exception;
}
```

The abstract class DoPatternImpl has three abstract member functions—body, preflist, and postlist. These are abstract because only the translator must define what code belongs to them corresponding to the script code of the DoPattern that the programmer wrote. All three abstract member functions are declared to throw Exception, because the script programmer cannot be prevented from calling native Java™ and C# functions that throw arbitrary exceptions. The prelist and postlist functions also have parameters—$rein and $repos. Normally, these are not used, but they are seen in use in the CapturePattern, as well as the hand-coding of a CapturePattern as a DoPattern.

CapturePattern Simply Subclasses DoPattern

The "'231 patent" indicated that CapturePattern is a special case of DoPattern. This has not substantially changed. In fact, in compiling regular expression side-effects to Java™ or C# code, CapturePattern is now a simple concrete derivation from the DoPatImp seen in the example code above.

```
public class CapturePattern extends DoPatternImpl {
    private Pat              pat;
    private varstring        cap;
    private long             startpos;
    private CapturePattern (varstring cap, Pat pat)
    {
       this.cap = cap;
       this.pat = pat;
    }
    public static Pat cons (varstring cap, Pat pat)
    {
       return new CapturePattern(cap, pat == null ?
       NullPat.cons( ) : pat);
    }
    protected Pat body ( )
    {
       return pat;
    }
    protected void prelist (varlong $repos, varstream $rein)
    {
       startpos = $repos.getlong( );
    }
    protected void postlist (varlong $repos, varstream $rein)
    throws IOException
    {
       cap.set($rein.get( ).stringAt(startpos, $repos.getlong( )));
    }
}
```

In the involved example given above, there was actually a CapturePattern in use. That code shows that the only thing needed to instantiate a CapturePattern is the "varstring" reference object being captured into, the Pattern being wrapped by the CapturePattern, and the call to CapturePattern.cons (varstring, Pat). In the above code, the ease to implement the CapturePattern is depicted. The CapturePattern is a concrete subclass of DoPatternImpl, providing the body method to just return the wrapped pattern, providing the prelist function to just save "startpos" member as the value of $repos, which is the stream position at the callpoint of the side-effects as given by the automata, and providing the postlist function to again look at the $repos variable allowing it to make a substring relative to these two capture points of $repos at prelist and postlist calls respectively, and stuffing the substring into the varstring that CapturePattern was constructed with.

InnerClass not Needed for CapturePattern (Further Justification for var<T>)

As further illustrated in the above code, CapturePattern is not modeled as an inner class, though this is the required design pattern for the general DoPattern. This is true because all of variables and parameters in the program, as well as reference parameters, become simple, tiny "var" objects that hold the actual Java™ primitive or Object. By assigning CapturePattern a reference to this tiny varstring object, one is assured that the garbage collector will not release the varstring reference until after it is last used, so that, since the side-effects of the postlist of CapturePattern have a reference, it is safe to stuff the captured string into the reference at side-effect time, which is the second "timeline" of a regex. The net result is that the CapturePattern does not need to be inlined as an inner class by the translator like a custom DoPattern, but can have a final implementation, and not as an inner class. (It later will be discussed and disclosed how all CapturePattern grammars could be inlined as inner classes by the translator in the DoPattern fashion, in the absence of the design decision to make all variables in the grammar tiny class objects.) Thus the translator only has to make the call to CapturePattern.cons(varstring, Pat). If one was not relying on the advantages of the tiny var object to model all variables and parameters in the program, including reference parameters, then there would be no CapturePattern class, but rather the translator would have to generate the inner class paradigm of the DoPattern for each instance of a CapturePattern.

Recapping the Advantages of Compiling the Grammar to Pure Java™ Code

Thus, it has been disclosed how it is possible to compile the side-effects of the '231 patent and '892 patent into pure Java™ or C# code, and the advantage of this compilation. Only the side-effects of the regex scripting grammar posed a problem for doing so, as Groovy and Scala have already proved that it is common to compile scripting grammars to Java™ code. But the second timeline of the side-effects relative to the composition of the regex seemingly require a specialized VM for the compilation. Also, the fact that the side-effects are a dynamically generated stream of instructions in the '231 patent whereas Java™ bytecodes, if they were streamed and executed, would only execute once and would not get Hotspot compilation, seemed to indicate that the '231 patent needed its own VM, and could not perform the Groovy/Scala transformation from regex scripting grammar to Java™ code.

Now with the techniques of as disclosed herein, it is possible to compile the regex scripts of the grammar to pure Java™ or C# code. The result is that the entire execution of the script gets the advantage of the hotspot compiler, both the regex side-effects and the functional code surrounding the regexes. In fact, some scripts have to do very hard tasks, and result in more lines of functional code than regex code. In compiling regular expression side-effects to Java™ or C# code, the entire script runs at hotspot speeds, albeit slower than normal hand-coded Java™ because the variables are all tiny objects, even int and long scalars.

The reference version of the grammar came prior to this disclosure and the discovery of the new technique of the inner classes for DoPattern and function locals and parameters, and the simple change to the automata to stream pseudo instructions as endpoints for the prelist and postlist of the DoPattern. The reference version involved the writing of a C++/JNI plugin which was used to execute the bytecodes of the specialized VM on behalf of the calling program. The following problems existed: (1) its hard to write a VM as fast as the Java™ and C# hotspot VMs, and the C++ VM used for the '231 patent and '892 patent was quite a bit slower than the Java™ VM, (2) it was discovered that being able to callback to native Java™ application functions directly from the script, or even the script side-effects was useful, and unfortunately the performance overhead of JNI callbacks is very very significant, (3) Enterprise Java™ Beans specification makes it difficult if not impossible for developers to create applications that require JNI libraries (i.e. a C++ plugin like the specialized VM of the reference version), and (4) there are hardware virtual machines such as the Azul hardware for Java™, which will only run 100% Java™ code, meaning that the reference version of the '231 patent and '892 patent would either not run on Azul machines, or would have to require that the specialized VM be written and embedded in Java™, which is very slow indeed.

The present implementation has succeeded for the regex grammars of the '231 patent and '892 patent, largely unchanged, in being able to compile scripts written in that grammar to 100% Java™ or C# code. This provides compatibility with all machines that require 100% Java™ or C# code, as well as meaning that the hotspot compiler and garbage collector of the host architecture are handling the execution of the script code. This is noteworthy, as it was discovered that with typical use cases of the grammar, side-effects had become the bottleneck of the script, so it is very significant that regex side-effects, unique in the art to compiling regular expression side-effects to Java™ or C# code and the prior two on which it is based, can now be executed at hotspot speed.

DoPatterns Nested Inside Other DoPatterns

The reference grammar of the '231 patent had to support DoPatterns nested in other DoPatterns, with the inner DoPatterns prelist and postlist statements having access to DoPattern-local variables of the outer DoPattern. This is possible in compiling regular expression side-effects to Java™ or C# code as well. The translator must be careful to notice when a DoPattern is inside another DoPattern. When this is the case, the translator makes the scoping point of the inner DoPattern's inner class to be within the body of the inner class of the outer DoPattern. Nested inner classes are presented in the following useful script, which demonstrates a design pattern in the regex grammar of compiling regular expression side-effects to Java™ or C# code:

```
function LineSet (String☐☐ lines, Pattern termpat)
{
    char sp = ' ';
    char lf = '\n';
    termpat = termpat butnot contains(sp | lf);
    Pattern p = do (String☐ ar = new String☐ ;
        do (String s; &s(termpat + ?sp; ar[ar.length] = s)*
```

```
            +
        ?If;
        lines[lines.length] = ar)
    *;
    return p;
}
```

This script function takes a double array of lines and produces a regex that captures a sequence of terms that make up a line, each term separated by a space, each line separated by line-feed, each line (array of terms) stuffed into the caller's array of lines. The butnot grammar of the '231 patent is used to make sure that the termpat, which defines what characters can be in a term, is cleansed to not include our two separators—space and linefeed. This powerful and reusable rule function (that cannot be accomplished in the art outside of these three inventions) is accomplished in about 10 lines of code, to contrast with the nested inner class translation to Java™ that follows:

```
public class MyScript {
    public class $func$LineSet {
        private vararray<array<string>> lines = new
vararray<array<string>>(type.arrayType(2, type.STRING),
string.class);
        private varpat termpat = new varpat( );
        private varchar sp = new varchar( );
        private varchar If = new varchar( );
        private varpat p = new varpat( );
        public $func$LineSet (array<array<string>>lines,
            Pat termpat)
        {
            this.lines.set(lines);
            this.termpat.set(termpat);
        }
        public class $dopat$1 extends DoPatternImpl {
            private vararray<string> ar = new vararray<string>
(type.arrayType(I, type.STRING), string.class);
            public class $dopat$2 extends DoPatternImpl {
                private varstring s = new varstring( );
                protected Pat body ( ) throws Exception
                {
                    varpat $result = new varpat( );
                    $result.set(ConcatPat.cons(
                    CapturePattern.cons(s, termpat.get( )),
                    OptionalPat.cons(CharPat.cons(sp.getsafe( ))),
                    false));
                    return $result.get( );
                }
                protected void prelist (varlong $repos, varstream $rein)
throws Exception
                {
                    // nothing to do here
                }
                protected void postlist (varlong $repos, varstream $rein)
throws Exception
                {
                    ar.get( ).makerefat(ar.get( ).length( )).set(s.get( ));
                }
            }
            protected Pat body ( ) throws Exception
            {
                varpat $result = new varpat( );
                $result.set(ConcatPat.cons(
                RepeatPat.cons(DoPattern.cons(new $dopat$2( )), 0),
                OptionalPat.cons(CharPat.cons(If.getsafe( ))),
                false));
                return $result.get( );
            }
            protected void prelist (varlong $repos, varstream $rein)
throws Exception.
            {
                ar.setLength(0);
            }
```
```
            protected void postlist (varlong $repos, varstream $rein)
throws Exception
            {
                lines.get( ).makerefat(lines.get( ).length( )).
                set(ar.get( ));
            }
        }
        public Pat $invoke ( )
        {
            sp.set(' ');
            If.set('\n');
            termpat.set(ButnotPat.cons(termpat.get( ),
            Inline.contains(UnionPat.cons(CharPat.cons(sp.getsafe( )),
            CharPat.cons(If.getsafe( ))))));
            p.set(RepeatPat.cons(DoPattern.cons(new $dopat$1 ( )),
0));
            return p.get( );
        }
    }
}
```

First, it should be apparent from the translation to the inner class design pattern for DoPatterns, that this would be too hard a job for a Java™ programmer to do correctly, and that indeed a specialized grammar is more terse and easier to wield and read than forcing the programmer to use compiling regular expression side-effects to Java™ or C# code's library directly, without a translator front end. Secondly, we see that $dopat$1 and $dopat$1 are the concrete subclasses of DoPatternImpl for the two DoPatterns found inside the LineSet function. The LineSet function is modeled as an inner class called $func$LineSet, nested inside the script's public class, because the LineSet function contains one or more DoPattern compositions. Also, $dopat$1 is the outer DoPattern, and its point of declaration makes it a nested class of $func$LineSet. Finally, $dopat$2 is inside the outer DoPattern, so its point of declaration makes it in turn a nested class of $dopat$1.

What to do about Variables Declared in Block Statement Scope

There are other scopes possible for variables, namely (1) block scope, and (2) for-statement scope. This is in keeping with making the look and feel of the grammar as much like Java™ or C# as possible. The first and second case both usually pertain to looping. If there are DoPatterns involved within the loop which use variables in either of these scopes, it is likely that the index variables are incremented in the loop and used in the side-effects of the DoPattern. It is better to close the door and throw an exception in the translator than to allow this, because if allowed, it will give incorrect results. The reason is that the index advances in the first "timeline" when the loop of the function executes to compose the composition of DoPatterns, but the DoPatterns' side-effects "fire" in the second timeline, after the loop has finished executing. The index variables, if allowed to persist to the second timeline, out of the block statement scope, will not be bound to the value at the time of the composition within the loop, but will all be bound to the final value of the index, because each DoPattern shares a reference to the same index variable. The correct way to solve this problem was seen in the very first example of this document, in which a "Capture" rule was created that contained a value parameter called "index" of type "int". Because it is passed to the function as a Java™.lang.Integer, which is immutable and much like the primitive "int" of Java™, it will be bound to each specific instantiation of the rule, if involved in a loop, and so the indices will be different for each invocation of the rule function. In conclusion, it is not desirable to attempt to employ the inner class design paradigm of this invention for these two types of variable scopings. That is, for block statement scope and for-statement scope, variables declared at those two points will not be available to any parts of a DoPattern at the same scope.

Modification Required for C# Nested Classes

One difference between C# and Java™ which affects compiling regular expression side-effects to Java™ or C# code relates to the way Java™ and C# handle nested or inner classes. In Java™, an inner class object has access thru a special hidden member to the "this" pointer of the class in which it is nested. Thus an inner class in Java™ is to be constructed ideally by the class in which it is contained (consistent with the usage described and disclosed herein), and by virtue of this hidden member pointing to the outer class object, has access automatically to all the variables in the outer class. This is exactly the semantic sugar needed to make the job of the translator easy, and allow the example code above to work as shown.

However, in C#, an inner class is nested as in Java™, and has visibility to the private members of the outer class, but it only can access outer members if its constructor is explicitly given a reference to the outer class object. That is, a C# nested class does not own a reference to any outer class object unless given one when constructed.

A suitable transformation to the example translator output given exists that will allow it to work as C# code. Simply construct the inner class in some member of the outer class, and when constructing the inner class, pass the this-value to the new inner class object. Then, save the "this"-value as some special variable, like $this, as a member of the inner class. When the translator wants the inner class object to refer to a variable in the outer class, reference it as "$this.myvar" rather than "myvar" as was done in the examples above. If the translator needs to go out two nesting levels, then reference the variable as "$this.$this.myvar", and so on.

Deterministic Finite Automata Needed for Invention

Another significant improvement to the '231 patent involves its automata. Streaming true instruction opcodes of the grammar is prohibited without a separate VM and corresponding VM instructions. But in compiling regular expression side-effects to Java™ or C# code, each DoPattern and each CapturePattern of the regex being matched, which instantiates a DoPattern bound to a capture string reference, are bound into a "drawer" of matchable regex a reference to that DoPatternImpl concrete object. Also bound into the automata's instruction arcs of the '231 patent, instead of the instructions of a prelist or postlist snippet, are a 2 word (word is an int in this case) pseudo instruction. The first word is an enum that indicates either prelist or postlist by type. The second word is the drawer-index. The drawer-indices are determined when the automata is constructed for the matchable regex, and are determined by an in-order recursive walk of the matchable regex, binding and incrementing an index for each DoPattern encountered in the traversal.

The automata then just has a single 2-word instruction for the prelist arc and a single 2-word instruction for the post-list arc to be streamed as the set of instructions (now pseudo instructions) to execute as side-effects of the automata. This resultant, streamlined automata is an important improvement because the automata have many fewer instruction opcodes streamed as side-effects.

Essential Side-Effect Iterating Function

Once the automata execution engine has streamed the pseudo-instructions, which replace without impact on the graph data structures the VM instructions of the '231 patent, the automata must now execute those instructions. This introduces another essential improvement in this area to the '231 patent and representative code needed to execute those instructions are presented as:

```
/**
 * There are 2 types of SnippetAtom(s) which encode
 * the side-effects of the stream.
 * Negative opcodes are special opcodes which do
 * something special. There are only a few.
 * Non negative opcodes = the number of characters
 * eaten by this execution of the automata
 * at the point of the side-effects
 */
public class SnippetAtom {
    /**
     * This opcode is embedded by the AAEngine only at the very
     * end of the stream of opcodes as a terminate loop condition.
     * It has no arguments.
     */
    public static final int     RTSSNIPPET = -1;
    /**
     * Very rare.
     * This opcode also indicates the number of characters
     * eaten by this execution of the automata.
     * Added to "streamstartposition" in the PatternState
     * to get "streamposition"
     *Arguments are a hi/lo pair of ints that make a long.
     * Likely to run out of automata state memory before
     *we ever generate this opcode.
     */
    public static final int     CURSORLONG = RTSSNIPPET-1;
    /**
     * This opcode is used to call the DoPattern prelist function
     */
    public static final int     SETDRAWERPRE =
                                CURSORLONG-1;
    /**
     * This opcode is used to call the DoPattern postlist function
     */
    public static final int     SETDRAWERPOST =
                                SETDRAWERPRE-1;
    public void execute (AAExecutionState state, int [] opcodes,
ArrayList<DoPatternImpl>drawers) throws Exception
    {
        int pos = 0;
        int trying = 0;
        varlong $repos = new varlong( );
        varstream $rein = new varstream( );
        $rein.set(state.smin);
        try {
            do {
                trying = 0;
                int op = opcodes[pos++];
                if (op >= 0) {
                    $repos.setlong(state.streamstartposition + op);
                } else {
                    if (op == CURSORLONG) {
                        long hi = opcodes[pos++];
                        long lo = opcodes[pos++];
                        state.smposition = state.streamstartposition + (hi
<< 32) + (lo & 0xFFFFFFFFL);
                    } else if (op == SETDRAWERPRE) {
                        int index = opcodes[pos++];
                        trying =1;
                        drawers.get(index).prelist($repos, $rein);
                    } else if (op == SETDRAWERPOST) {
                        int index = opcodes[pos++];
                        trying = 1;
                        drawers.get(index).postlist($repos, $rein);
                    } else if (op == INNOP || op == OUTNOP) {
                        // ignore these, they should have
// been stripped anyway
                    } else if (op == RTSSNIPPET) {
                        return;
                    } else {
                        Sneaky.Throw(new RegexEngineError("invalid
snippet opcode"));
                    }
                }
            } while (true);
```

-continued

```
        } catch (IndexOutOfBoundsException e) {
            if (trying == 0)
                Sneaky.Throw(new RegexEngineError("failure
    to terminate snippet opcodes"));
                else if (trying == 1)
                    Sneaky.Throw(new RegexEngineError("invalid
    snippet drawer index"));
                else
                    throw e;
        }
    }
}
```

The "enums" SETDRAWERPRE and SETDRAWERPOST will be appreciated as the necessary pseudo instructions corresponding to the prelist and postlist respectively. From the code above, it is understood that these opcodes are used to get the drawer-index from the second word of these 2-word instructions, and to then invoke the prelist or postlist member of the DoPatternImpl object bound.

Additional opcodes which relate to the stream position as the automata encounters the prelist and postlist instruction-arc are disclosed and further detailed in the next section.

Additional Pseudo Opcode Instruction Accumulation for CapturePattern

Two more pseudo instructions must be inserted into the instruction streamed. However, these instructions are not embedded in the automata's instruction arcs. Instead, these instructions are embedded automatically by the automata execution engine whenever it embeds a SETDRAWERPRE or SETDRAWERPOST instruction from the instruction-arc of the graph. If the character having just been eaten from the stream forces a traversal of a prelist instruction-arc (SETDRAWERPRE), it will optimistically make that traversal before the char is eaten, and create a new automata thread. A pseudo instruction is saved for the stream position just in front of the SETDRAWERPRE pseudo instruction. In fact, for the automata engine, the CapturePattern does not special case SETDRAWERPRE or SETDRAWERPOST. It just always saves a stream-position pseudo instruction in front of any other instructions that it saves. The SETDRAWERPRE and SETDRAWERPOST are the only instructions in the graph's instruction arcs, and they have negative values. When the automata accumulates the instruction for stream position at the point of encountering an instruction arc, the difference between the beginning position of the stream when the automata execution engine started matching characters and the current position is calculated, and that value accumulated prior to the pseudo-instruction. If that saved value is bigger than the biggest int, a three word instruction is presented, the first being CURSORLONG and the next two words being the two halves of the "Long."

The "repos" Keyword

It will be appreciated that the automata saves the stream positions as positive ints in the instruction stream it produces, whenever it encounters a SETDRAWERPRE or SETDRAWERPOST. It does so because the DoPatternImpl object that will be invoked by these two drawer instructions might need access to the stream position.

There are at least two reasons that the DoPattern might need access to the stream position. The first is that it might be a CapturePattern object. Study of the code given in an above section shows that the CapturePattern uses both parameters of the prelist and postlist, which are $rein of type varstream and $reout of type varlong. It does so to create a substring relative to the stream being matched! Without the $repos variable given to it by the automatically generated stream position pseudo instruction, it could not perform the capture. The pseudo instruction that produces the value of $repos is a relative stream position, whereas the $repos argument passed is absolute, because it is much easier to work with absolute positions with strings and streams, that both implement the Matchable interface, in getting substrings. This choice also involves the fact that a relative position is more likely to fit in an int then an absolute position for huge streams.

Hand-Coding a Custom Capture Design Pattern from DoPattern

Not only is $repos useful in implementing the CapturePattern, but it also stands alone as a keyword of the script grammar. The $repos keyword can be used in the DoPattern grammar itself, in any prelist comma-separated statement, or any postlist comma-separated statement. It is instructive to note, the $repos keyword is used under the covers to implement the CapturePattern, not as a keyword of the grammar, but as an argument of prelist and postlist functions of DoPatternImpl. But the $repos keyword is also a keyword, and there are certainly times where the programmer would rather have capture points then substrings, as seen in practice.

Even if the script grammar did not offer the CapturePattern syntax, the script programmer could use the keywords $rein and $repos to construct a capture string as follows:

```
function Pattern Capture (String& s, Pattern p)
{
return do (long a=$repos; p; s=$rein.stringAt(a, $repos));
}
```

The code that the translator generates is not provided, because examples of this code has been disclosed and discussed. It is appreciated, however, that $rein is of type varstream, which is a var<Stream>. The Stream class models a Stream in the grammar, and stringAt is a public api of a Stream. The translator, as already stated, is able to generate code that allows script programmers to make native calls of native functions that are defined outside of the code generated for the script.

Caching and Sharing of Automata

Any regex composition that might and ultimately is executed (unless it is just a sub-expression) now consists of the following parts: (1) composition characteristics, that are part of the signature, and thus hash of the automata, (2) the spatial structure that relates just the in-out points of the drawers of the DoPattern as determined by the recursive walk of the automata, which is the second and last part of the hash of the automata, and (3) the binding of the specific DoPatterns objects to the drawer indices at automata bind time. Thus, regexes that have markedly different side-effects can have the same spatial structure of DoPatterns relative to other Patterns, and the same matching characteristics, and thus cached and shared in different use cases. Furthermore, scripts might be invoked by several threads simultaneously, can use a threadsafe get for immutable automata and a threadsafe checkin/checkout for lazily constructed automata. The costly step of constructing the automata is eliminated whenever the hashing signature of the regex is the same as a regex that was already matched, and the automata has already been created by another thread.

As disclosed, two regexes may have unrelated purposes, or related purposes but different side-effects. In fact, if the document level design pattern of the '892 patent is followed, a base class is created for matching characteristics and a subclass is created to insinuate side-effects. Two different subclasses could produce different side-effects, but if the in-out points of all the DoPatterns are the same spatially relative to the matching characteristics, then these two regexes can share the same automata, serially checking out, binding to their own side-effect drawers, and then checking in.

It is much more likely that several threads will be running the same script creating the same regex compositions and sharing the same related automata, then that unrelated automata will be seen by the cache as the same, for the purposes of bind and use in a match. For this reason, the automata checkout cache must be protected by a thread-safe publishing of its structure. Thus in compiling regular expression side-effects to Java™ or C# code, when a regex is not marked as lazy (by script programmer choice), its resulting automata, which is a DFA despite the insinuation of side-effects, is effectively immutable. Now, with the separation of the side-effect binding drawers to pre-list and post-list virtual functions, the costly step (time and memory) of constructing the immutable automata need be done only once, for all threads that use that automata, and each thread need only pay the cost of binding drawers before the match, while sharing the one copy of the automata. The present invention has extended the '231 invention by separating the array of prelist and postlist function objects from the automata with the pseudo-instructions for the drawer-indices, and these 2-word drawer-index instruction arcs in the automata are independent and immutable relative to the regex, and not tied to the function objects they reference. This step, permitting the sharing of related automata by many threads, is best practice for compiling regular expression side-effects to Java™ or C# code versus the NFA art like Java™ regex because the automata of compiling regular expression side-effects to Java™ or C# code are much bigger and time-consuming in their creation than the backtracking NFAs of the art.

Figure 2:
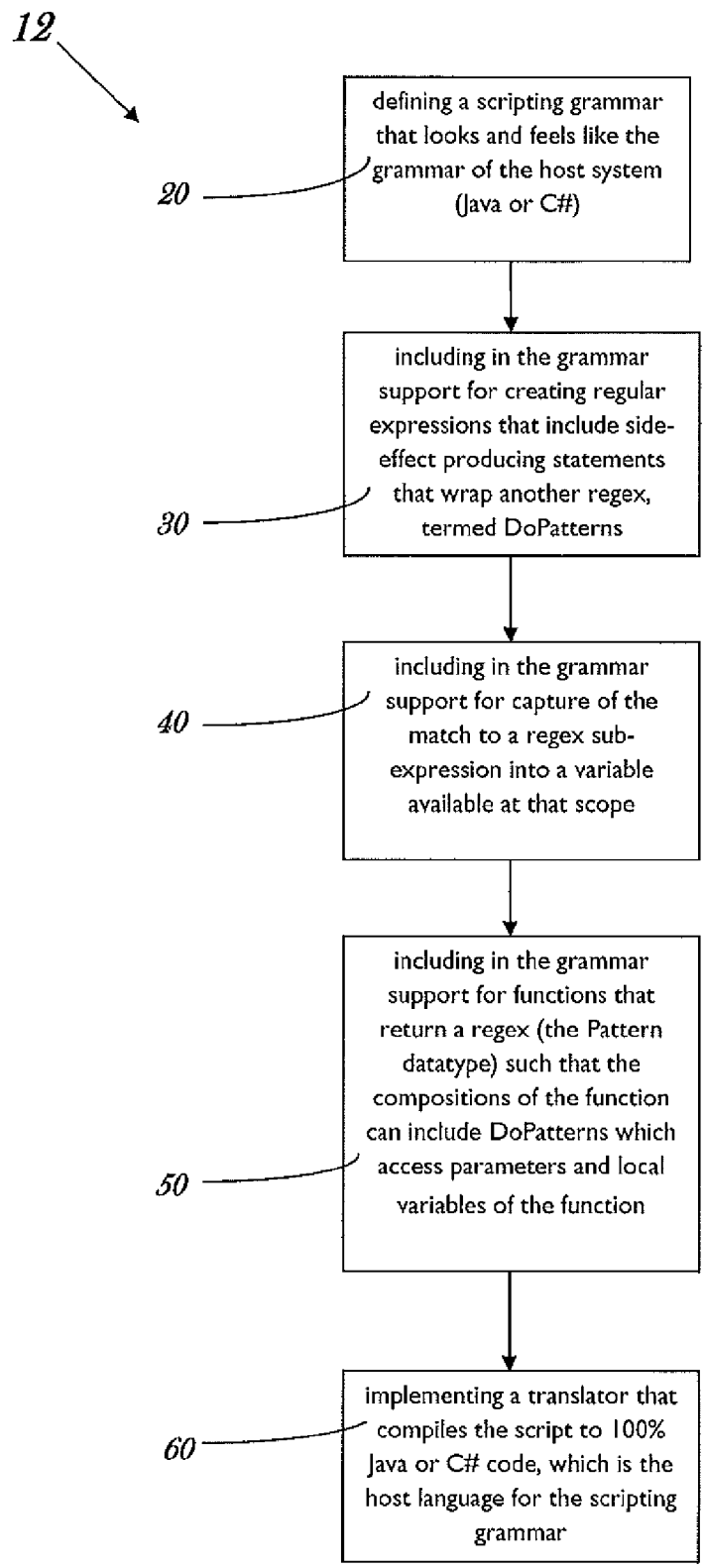
FIG. 2 is a flow chart illustrating an example method that may be performed by a computing device to compile regular expression side-effects to Java™ or C# code.

System and Method for Compiling Regular Expression Side-Effects to Java™ or C# Code Accordingly, an embodiment for a computer-implemented method of rendering regular expression side-effect statements to 100% Java™ or C# code has been disclosed and described, FIGS. 1-3. An embodiment for a computer-implemented method 12 of rendering regular expression side-effect statements to 100% Java™ or C# script code 6 includes the steps of:

a) defining a scripting grammar that looks and feels like the grammar of the host system (Java™ or C#) 20;

b) including in the grammar support for creating regular expressions that include side-effect producing statements that wrap another regex, termed DoPatterns; these regular expressions are generated by the regex translator 4 in the Java™ or C# compiled scripts 6 and the regex objects and regex execution statements (matching operators) are individual classes and functions written in the regex library 5, 30;

c) including in the grammar support for capture of the match to a regex sub-expression into a variable available at that scope, which is offered by a CapturePattern based on a subclass of DoPatternImpl wrapped by a DoPattern construction, the CapturePattern class being coded in the regex library 5 and used in the translated script 6, 40;

d) including in the grammar support for functions that return a regex (the Pattern datatype) such that the compositions of the function can include DoPatterns which access parameters and local variables of the function, such parameters and local variables defined by the regex translator 4 as data members of the inner class modeling the function at its scoping point in the script, such that the data members that model the local variables and parameters of the inner-class-modeled function can be read and written to at side-effect time, which is after the function returns; this support being provided by the regex translator 4 which generates the scripts 6 according to said design pattern; 50 and e) implementing a translator that compiles the script to 100% Java™ or C# code, which is the host language for the scripting grammar 60, FIG. 2.

The embodiment for a computer-implemented method 12 of rendering regular expression side-effect statements to 100% Java™ or C# code further includes the step of modeling a DoPatternImpl (defined in the regex library 5) as a pure abstract class with an abstract "body" function, and abstract "prelist" function and an abstract "postlist" function 70, FIG. 3.

The method of translating the scripts is provided preferably as a library also written in C# or Java™ (built in the language of the VM 2) and either compiled supplemental to application 3 compilation or alternatively, compiled dynamically while the application is running, said method 4 rendering the entire script, including regular expression side-effect statements, as 100% Java™ or C# code, which can easily be used by the application 3 at hotspot speed.

Note that the components proper 4 and 5 of the invention generate the scripts 6 written by the application programmer, and do so only on computer devices 1 for which there is support for an implementation of a C# or Java™ VM 2 that is used by applications which use the invention components of a regex script translator 4 and a regex library 5 to write scripts 6 conforming to the grammar of the invention, FIG. 1.

An embodiment of the computer-implemented method of rendering regular expression side-effect statements to 100% Java™ or C# code provides a translator module for a DoPattern grammar in the script that generates a subclass of DoPatternImpl with the "body", "prelist" and "postlist" functions rendering the 3 components of a specific DoPattern in a script, such that this subclass is defined as an inner class of the scoping point of the DoPattern in the script and the member variables of the concrete inner DoPatternImpl class are the variables local to the DoPattern prelist and postlist statements, and such that the prelist and postlist statements have access because they are members of an inner class to variables at all scoping points external to the DoPattern.

An embodiment of the computer-implemented method of rendering regular expression side-effect statements to 100% Java™ or C# code provides prelist and postlist statements of the concrete instantiation of DoPatternImpl, that models a DoPattern in the specific script will be able to execute at side-effect time, long after the DoPattern construction takes place, and have access to all the data and functions at and outside of their scoping points, in particular, allowing the prelist and postlist functions to access the variables local to the prelist and postlist statements of the DoPattern at side-effect time.

An embodiment of the computer-implemented method of rendering regular expression side-effect statements to 100% Java™ or C# code provides a DoPattern in the grammar that can be nested inside another DoPattern, which is translated to Java™ or C# as an inner class nested inside the inner class modeling the outer DoPattern, so that the inner DoPattern's prelist and postlist statements have access not only to the variables of their own pre-list and post-list but also to the variables scoped to the outer DoPattern.

An embodiment of the computer-implemented method of rendering regular expression side-effect statements to 100% Java™ or C# code provides the proper translation for a "rule" or function that returns a Pattern/regex and defines its result to include one or more DoPatterns which access the parameters of the function or its local variables in its side-effect inducing prelist and postlist statements.

An embodiment of the computer-implemented method of rendering regular expression side-effect statements to 100% Java™ or C# code further provides that such a "rule" (including DoPattern grammars) must be declared as an inner class, rather than a simple stack-based function, with its constructor copying all of the modeled functions parameters to said inner class's data members, and modeling the local variable of said rule also as data members of the inner class, so that side-effect statements in DoPatterns of the rule (prelist and postlist statements) may access the parameters at side-effect time, after the rule has been composed and its regex result returned.

An embodiment of the computer-implemented method of rendering regular expression side-effect statements to 100% Java™ or C# code provides that the CapturePattern does not need to be an inner class, given that all variables in the grammar are tiny holder-objects, and can instead be the construction of a CapturePattern class which subclasses from DoPatternImpl and that references the varstring capture object variable being captured into and the regex being matched for the capture.

An embodiment of the computer-implemented method of rendering regular expression side-effect statements to 100% Java™ or C# code provides that compilation to inner classes of the critical DoPatterns and CapturePatterns and the rules (or functions returning Pattern) which contain a DoPattern grammar, so that for the entire resultant regex scripting grammar, both the side-effect inducing statements embedded in the regex are matched, and the normal functional statements of a script instance, can execute at hotspot compilation speed, being rendered as 100% Java™ or C# code.

An embodiment of the computer-implemented method of rendering regular expression side-effect statements to 100% Java™ or C# code further includes a computer system for translating a regular expression scripting grammar into 100% Java™ or C# code, whereby the scripting grammar supports embedding of side-effect producing statements into the regular expression, the system comprising:
  a) a computer processor 1 and supporting input/output devices;
  b) the programming language and regex grammar of claim 1;
  c) a host language and VM operating system such as Java™ or C# 2 (which restricts the choices of computer device to those for which such VM is offered) that offers garbage collection for all of its objects and which offers inner or nested classes;
  d) a computer program which translates to Java™ or C# 4 and then executes modules/scripts written in the programming language of claim 1 and, while the computer program is being hosted by the computer processor, the computer program and script modules are also being hosted by the Java™, C#, or similar VM architecture 3; and
  e) a computer library 5 written in the host language (C# or Java™) which embeds a regular expression composition and execution engine capable of properly executing the side-effects of DoPatterns and CapturePatterns at any sub-composition level of the regular expression being matched, FIG. 1.

The architecture for the system for rendering regular expression side-effect statements to 100% Java™ or C# code can be described generally as follows, in reference to FIG. 1:

At the bottom of the figure is a computer device 1 such as an Intel based processor or AMD process or android mobile phone device, which is required for the invention. This device must have support for and the deployment on it of a C# or Java™ VM 2 (or equivalent) because of the need for a high-quality garbage collector to make the side-effects of the DoPattern inner classes available to access the variables of the DoPattern or rule that includes a DoPattern long after the function which composed the DoPattern has returned. On top of the VM is any application or "app" 3 such as an application server "app" which has the need to solve complex Pattern matching problems that include regex side-effects more powerful than simple N-th capture of a parenthetical subexpression match (i.e. the DoPattern grammar of the invention). The translator of the invention 4 is technically optional as the programmer of the application 3 could write Java™ code conforming to the design pattern disclosed in this invention and the public apis of the regex library 5 of the invention. However, it is seen that this is usually far more difficult than solving the matching/side-effect problems with scripts written in the grammar, and using the regex translator 4 of the invention to compile those scripts 6 written by the application programmer to 100% Java™ or C# code.

The regex library 5 of the invention thus works in conjunction with the script translator 4 of the invention, such that the compiled scripts 6 make the appropriate calls to the regex library functions and classes on behalf of the application programmer 3 using the computer device 1 and the VM 2 needed by the invention.

An embodiment of the computer-implemented method of rendering regular expression side-effect statements to 100% Java™ or C# code further includes a computer system for translating a regular expression scripting grammar into 100% Java™ or C# code, wherein prelist and postlist statements of the DoPattern object are embedded into the regex automata as pseudo-instructions referencing drawer-indices and in which the binding of the regex object to the automata for execution involves the putting of the object references to the concrete DoPatterns into the array of drawers.

An embodiment of the computer-implemented method of rendering regular expression side-effect statements to 100% Java™ or C# code further includes a computer system for translating a regular expression scripting grammar into 100% Java™ or C# code, wherein the automata performs the match by accumulating the pseudo-instructions, and then iterates the pseudo instructions using one of two opcodes to invoke a prelist or postlist member function of the object found at the drawer-index of the second word of the instruction.

Summary

All of the steps required to implement compiling regular expression side-effects to Java™ or C# code are presented, with the proviso that the regex/automata execution engine of compiling regular expression side-effects to Java™ or C# code is almost exactly the same as that disclosed in the '231 patent. Use of embodiments of compiling regular expression side-effects to Java™ or C# code with examples of how script code is compiled to Java™ and C# code is fully disclosed. As discussed, for the most part, the grammar of, and proper use thereof, is fully disclosed in the '231 patent and/or the '892 patent. One significant change and improvement has been made to the '231 patent and/or the '892 patent in the way of a semantic sugar enhancement: namely that the "rules" of these inventions are now simply functions and member functions that return Patterns. That is, in compiling regular expression side-effects to Java™ or C# code, the only difference between a "rule" and a function is that a "rule" is simply a function or member function returning a Pattern data-type.

I claim:

1. A computer-implemented method of rendering regular expression side-effect statements to 100% Java™ or C# code, the method comprising the steps of:

a. defining a programming language or grammar that produces scripts that compile to Java™ or C# classes and run within the host Java or C# system;
b. including among regular expression forms in this grammar a DoPattern as a means to wrap a matching sub-expression (regex) with side-effect producing functional statements that fire before and after the match and whose side-effect statements have access to variables in all outer scopes; and the CapturePattern as a means to capture the match to the wrapped sub-expression (regex) into a variable available in the scope of the regular expression in which it is found;
c. compiling the side-effects of the DoPattern (the pre- and post-statement lists) as bodies of Java functions that are accessible as implementations of abstract functions of an abstract DoPattern class that includes abstract prelist ( ) and postlist ( ) functions;
d. adding to the abstract prelist and postlist functions of the DoPattern class access to the parameters $rein and $repos so that the CapturePattern can be implemented as a specialized variation of the DoPattern;
e. providing a regular expression execution engine capable of calling the java functions that compile the pre-list and post-list statements of the DoPattern at the proper points relative to the data stream being matched, whereby the DoPattern and especially the CapturePattern can properly reference matching points of the stream;
f. obtaining hot-spot execution speeds for all of the side-effects of the regular expression (DoPattern statements and CapturePattern data substring to variable capture) as these side-effects are compiled to the implementations of the abstract prelist and postlist Java™ or C# functions; and
g. including a translator that compiles this specialized scripting grammar entirely to Java™/C# classes.

2. The computer-implemented method of claim 1, further comprising the step of modeling a DoPatternImpl as a pure abstract class with an abstract body function, an abstract prelist function, and an abstract postlist function.

3. The computer-implemented method of claim 2, wherein the translator module for a DoPattern grammar in the script generates a subclass of DoPatternImpl with the body, prelist, and postlist functions rendering the 3 components of a specific DoPattern in a script, such that this subclass is defined as an inner class of the scoping point of the DoPattern in the script and the member variables of the concrete inner DoPattern class model the variables local to the DoPattern pre-list and post-list statements, and such that the pre-list and post-list statements have access because they are members of an inner class to variables at all scoping points external to the DoPattern.

4. The computer-implemented method of claim 3, wherein a DoPattern in the grammar can be nested inside another DoPattern, which is translated to Java™ or C# as an inner class nested inside the inner class modeling the outer DoPattern, so that the inner DoPattern's pre-list and post-list statements have access not only to the variables of their own pre-list and post-list but also to the variables scoped to the outer DoPattern.

5. The computer-implemented method of claim 1, wherein a "rule" or function that returns a Pattern/regex may define its result to include one or more DoPatterns which access the parameters of the function or its local variables in its side-effect inducing pre-list and post-list statements.

6. The computer-implemented method of claim 5, wherein such a "rule" must be declared as an inner class, rather than a simple stack-based function, with its constructor copying all of the modeled functions parameters to said inner class's data members, and modeling the local variable of said rule also as data members of the inner class, so that side-effect statements in DoPatterns of the rule (pre-list and post-list statements) may access the parameters at side-effect time, after the rule has been composed and its regex result returned.

7. The computer-implemented method of claim 1 wherein the CapturePattern does not need to be an inner class, given that all variables in the grammar are tiny holder-objects, and can instead be the construction of a CapturePattern class which subclasses from DoPatternImpl and that references a varstring capture object variable being captured into and the regex being matched for the capture.

8. The computer-implemented method of claim 1, wherein, by compilation to inner classes of the critical DoPatterns and CapturePatterns as well as the rules (or functions returning Pattern) which contain a DoPattern grammar, the entire regex scripting grammar of claim 1, including both the side-effect inducing statements embedded in the regex being matched and the normal functional statements of a script instance, can execute at hotspot compilation speed, being rendered as 100% Java™ or C# code.

9. A tangible, non-transitory computer-readable medium comprising instructions for causing regular expression side-effect statements to be rendered as 100% Java™ or C# code, the medium comprising:
a) defining a scripting grammar that includes functional statements and regular expressions that include a form of capture into variables seen/available in its scope and regular expressions that wrap a matching sub-expression with functional statements that match as general side-effects of the regular expression being matched;
b) including in the grammar support for creating regular expressions that include side-effect producing statements that wrap another regex, termed DoPatterns;
c) including in the grammar support for capture of the match to a regex sub-expression into a variable available at that scope;
d) including in the grammar support for functions that return a regex (the Pattern datatype) such that the compositions of the function can include DoPatterns which access parameters and local variables of the function; and
e) implementing a translator that compiles the script to 100% Java™ or C# code, which is the host language for the scripting grammar.

10. The tangible, non-transitory computer-readable medium comprising instructions for causing regular expression side-effect statements to be rendered as 100% Java™ or C# code of claim 9, the medium further comprising modeling a DoPatternImpl as a pure abstract class with an abstract body function, an abstract prelist function, and an abstract postlist function.

11. A computer system for translating a regular expression scripting grammar into 100% Java™ or C# code, whereby the scripting grammar supports embedding of side-effect producing statements into the regular expression, the system comprising:
a) a computer processor;
b) the programming language and regex grammar of claim 1;
c) a host language and virtual machine operating system such as Java™ or C# that offers garbage collection for all of its objects and which offers inner or nested classes;
d) a computer program which translates to Java™ or C# and then executes modules/scripts written in the programming language of claim 1 and, while the computer program is being hosted by the computer processor, the computer program and script modules are also being hosted by the Java™, C#, or similar virtual machine architecture; and e) a computer library written in the host language (C# or Java™) which embeds a regular expression composition and execution engine capable of properly executing the side-effects of DoPatterns and CapturePatterns at any sub-composition level of the regular expression being matched.

12. The computer system for translating a regular expression scripting grammar into 100% Java™ or C# code of claim 11, wherein pre-list and post-list statements of the DoPattern object are embedded into the regex automata as pseudo-instructions referencing drawer-indices and in which the binding of the regex object to the automata for execution involves the putting of the object references to the concrete DoPatterns into the array of drawers.

13. The computer system for translating a regular expression scripting grammar into 100% Java™ or C# code of claim 12, wherein the drawer-indices and the automata are determined uniquely by (a) the matching characteristics of the regex that produces the automata, and (b) the positions of DoPattern sub-expressions relative to the matching characteristics, independent of the actual prelist and postlist function objects tied to the DoPatterns; whereby the automata is effectively immutable along with its regex and can be shared by any number of simultaneous threads, given the separation of the "drawers" for the prelist and postlist function objects from the automata.

14. The computer system for translating a regular expression scripting grammar into 100% Java™ or C# code of claim 13, wherein the automata performs the match by accumulating the pseudo-instructions, and then iterates the pseudo instructions using one of two opcodes to invoke a prelist or postlist member function of the object found at the drawer-index of the second word of the instruction.

* * * * *